(12) United States Patent  (10) Patent No.: US 7,987,391 B2
Butcher  (45) Date of Patent: Jul. 26, 2011

(54) FAULT TOLERANCE USING DIGESTS

(75) Inventor: Lawrence Butcher, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 2220 days.

(21) Appl. No.: 10/392,698

(22) Filed: Mar. 20, 2003

(65) Prior Publication Data

US 2004/0199817 A1    Oct. 7, 2004

(51) Int. Cl.
*G06F 11/00* (2006.01)
(52) U.S. Cl. .......................................... 714/38.1; 714/11
(58) Field of Classification Search .................... 714/11, 714/38.1, 38
See application file for complete search history.

(56) References Cited

U.S. PATENT DOCUMENTS

| | | | | |
|---|---|---|---|---|
| 4,135,240 | A * | 1/1979 | Ritchie ........................ | 711/164 |
| 6,263,452 | B1 * | 7/2001 | Jewett et al. ................ | 714/9 |
| 2003/0159083 | A1 * | 8/2003 | Fukuhara et al. ............ | 714/11 |

OTHER PUBLICATIONS

Tanenbaum, Andrew S. "Structured Computer Organization (Third Edition)" (c) 1990 Prentice Hall, Inc. pp. 11-13.*
"Firewall" Microsoft Computer Dictionary (Fifth Edition). Copyright 2002. Microsoft Press.*
Handbook of Applied Cryptology. Copyright 1997 CRC Press, Inc. p. 33.*

* cited by examiner

*Primary Examiner* — Robert Beausoliel, Jr.
*Assistant Examiner* — Joseph D Manoskey
(74) *Attorney, Agent, or Firm* — Marsh Fischmann & Breyfogle LLP; Kent A. Lembke

(57) ABSTRACT

A method and apparatus are provided, the method and apparatus comprising running a plurality of identical programs on a plurality of identical computers and recording information about at least some state updates done within each of the plurality of the identical programs running on the plurality of the identical computers using a plurality of digests of the at least some state updates. The method and apparatus also comprises comparing the plurality of the digests to determine whether at least one of the plurality of the identical programs running on the plurality of the identical computers has failed.

35 Claims, 14 Drawing Sheets

FAULT TOLERANCE USING DIGESTS

BACKGROUND OF THE INVENTION

1. Field of the Invention

This invention relates generally to computer software and, more particularly, to a method and an apparatus for using digests to achieve fault tolerance in computer hardware and/or software.

2. Description of the Related Art

Computers make mistakes and often crash, particularly computers using computer hardware and/or software that is flaky. The vast majority of computers operate in isolation. These isolated computers run and, if they make a miscalculation and/or if they are bumped or jostled and have a temporary failure and/or if they are powered off, the calculation the isolated computer is performing may be lost.

A small number of computers have been designed to be fault tolerant in one of several ways. Conventionally, a group of three or more computers have been made to cooperate tightly. The three or more computers typically check one another constantly. If one of the three or more computers makes a memory reference and/or an input/output (I/O) reference that is different from the memory reference and/or the input/output (I/O) reference made by the others of the three or more computers, then the computer behaving differently is treated as failing.

In another conventional way to achieve fault tolerance, a group of two computers have been made to run in lock-step. Whenever the two computers disagree, it is sometimes possible to have enough of the corresponding "state" around in each of the respective computers that the calculation on which the two computers disagree can be re-executed. In this way, the failing computer can be identified.

Yet another conventional way to implement fault tolerance is to have computer programs be explicitly written to check themselves and each other. However, all these conventional ways to implement fault tolerance have the drawbacks that they either require tight and/or lock-step cooperation between the computer hardware and/or massive rewrites of user-level computer software.

The present invention is directed to overcoming, or at least reducing the effects of, one or more of the problems set forth above.

SUMMARY OF THE INVENTION

In one aspect of the present invention, a method is provided, the method comprising running a plurality of identical programs on a plurality of identical computers and recording information about at least some state updates done within each of the plurality of the identical programs running on the plurality of the identical computers using a plurality of digests of the at least some state updates. The method also comprises comparing the plurality of the digests to determine whether at least one of the plurality of the identical programs running on the plurality of the identical computers has failed.

In another aspect of the present invention, a computer-readable, program storage device is provided, encoded with instructions that, when executed by a computer, perform a method, the method comprising running a plurality of identical programs on a plurality of identical computers and recording information about at least some state updates done within each of the plurality of the identical programs running on the plurality of the identical computers using a plurality of digests of the at least some state updates. The method also comprises comparing the plurality of the digests to determine whether at least one of the plurality of the identical programs running on the plurality of the identical computers has failed.

In yet another aspect of the present invention, a computer programmed to perform a method is provided, the method comprising running a plurality of identical programs on a plurality of identical computers and recording information about at least some state updates done within each of the plurality of the identical programs running on the plurality of the identical computers using a plurality of digests of the at least some state updates. The method also comprises comparing the plurality of the digests to determine whether at least one of the plurality of the identical programs running on the plurality of the identical computers has failed.

In another aspect of the present invention, an apparatus is provided, the apparatus comprising a plurality of identical computers capable of running a plurality of identical programs and a plurality of digests capable of recording information about at least some state updates done within each of the plurality of the identical programs running on the plurality of the identical computers. The apparatus also comprises a controller/comparator capable of comparing the plurality of the digests to determine whether at least one of the plurality of the identical programs running on the plurality of the identical computers has failed.

A more complete understanding of the present invention, as well as a realization of additional advantages and objects thereof, will be afforded to those skilled in the art by a consideration of the following detailed description of the embodiment. Reference will be made to the appended sheets of drawings, which will first be described briefly.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
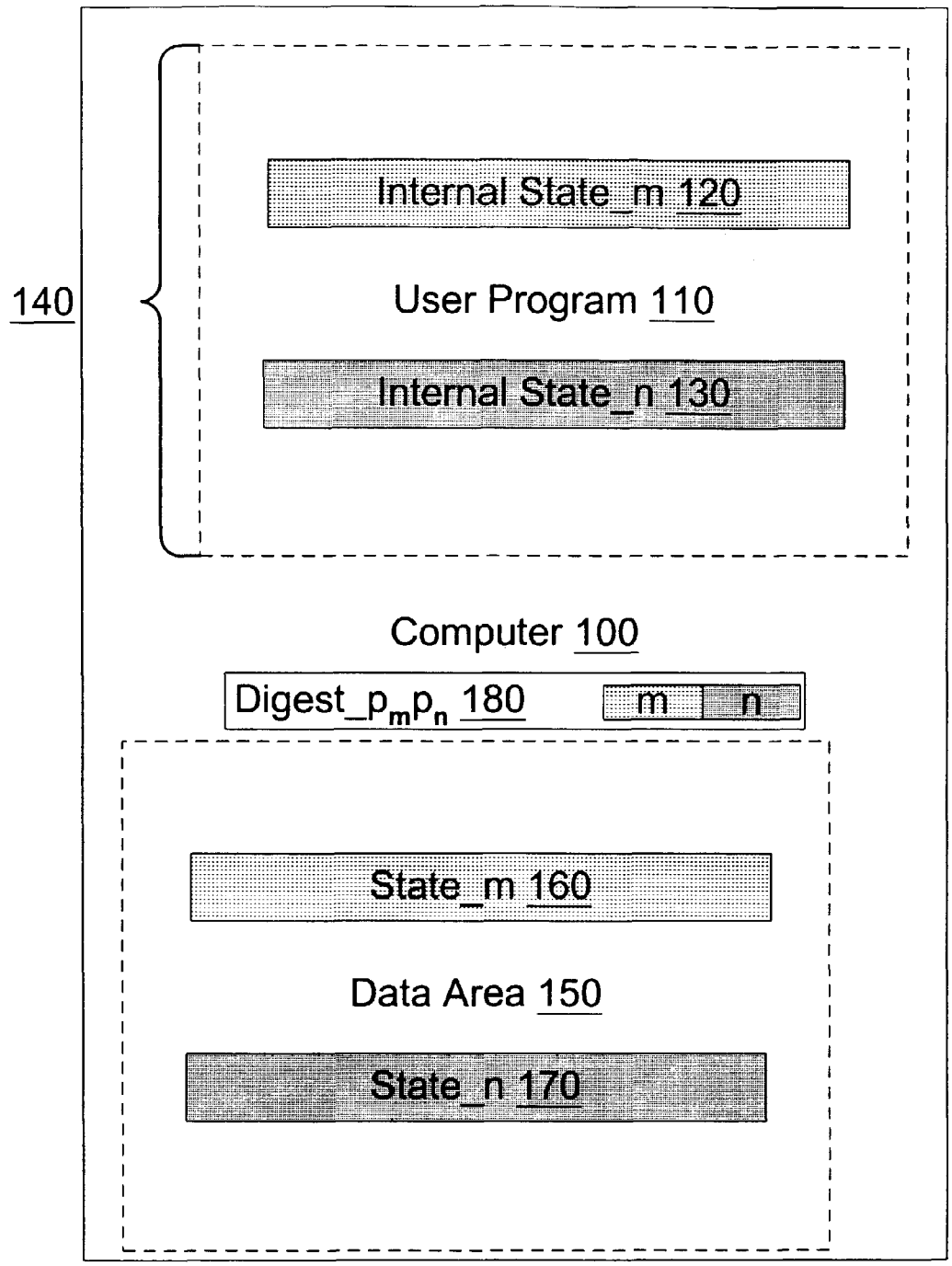
FIGS. 1-14 schematically illustrate various embodiments of a method, a system and a device according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method, a system and a device according to the present invention are shown in FIGS. 1-14. As shown in FIG. 1, a computer 100 executes a user program 110. The computer 100 updates the state in the user program 110 and a data area 150. The computer 100 also sends data from inside the user program 110 to the outside of the user program 110 and also receives data from outside the user program 110 to the inside of the user program 110, using kernel calls, file accesses, Internet network sends and receives, and the like. The user program 110 and all of its internal state, made up of internal state_m 120 and internal state_n 130, for example, may be considered one giant state machine 140. The computer 100 has the job of updating that one giant state machine 140. The state in the data area 150 may be made up of state_m 160 and state_n 170, for example, corresponding to the internal state_m 120 and the internal state_n 130, respectively, in the user program 110.

Figure 2:
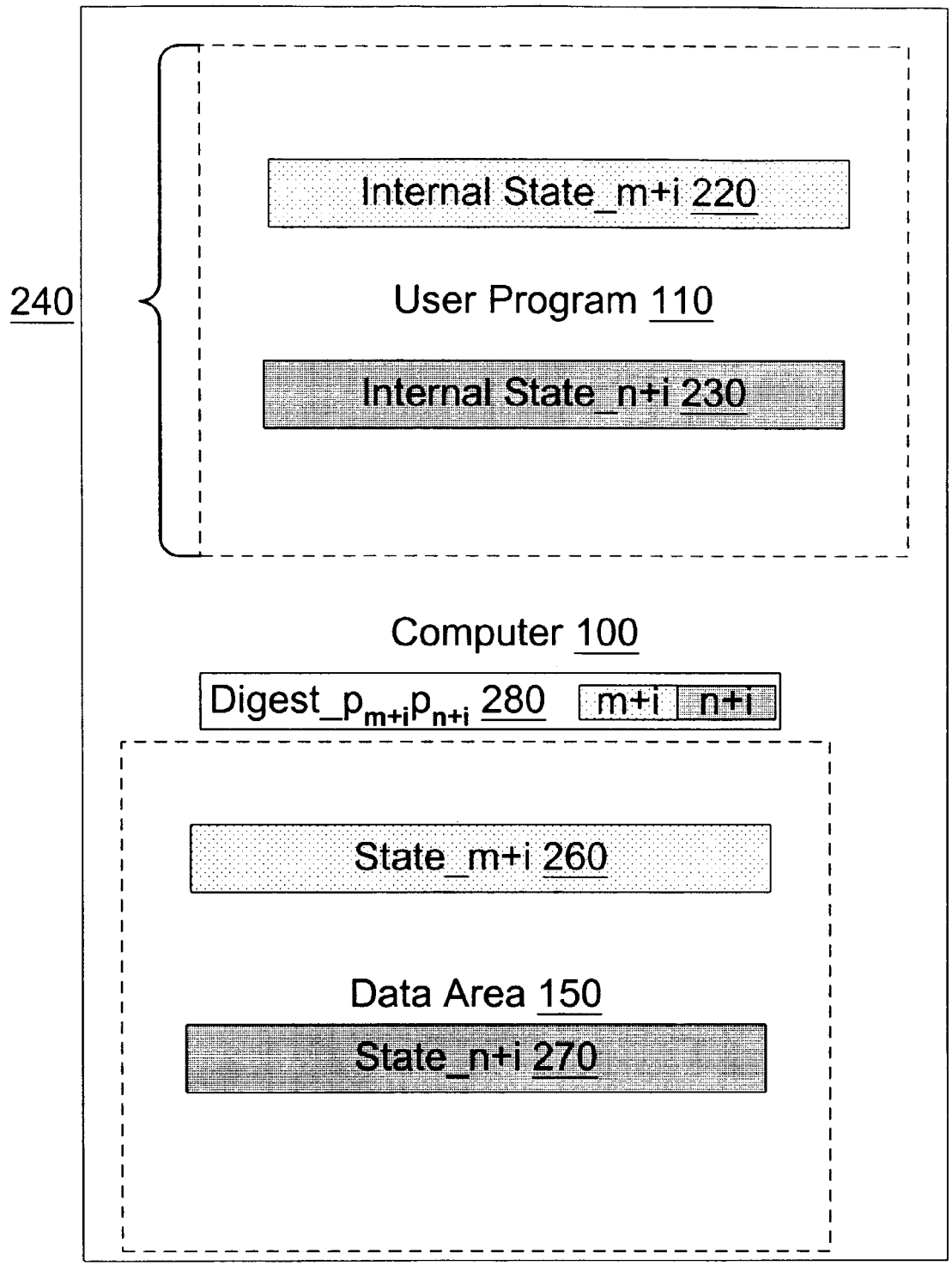

As shown in FIG. 2, the computer 100 executing the user program 110 updates the state in the user program 110 and the data area 150. FIG. 2 schematically illustrates a later point in time than the earlier point in time schematically illustrated in FIG. 1. In particular, the internal state of the user program 110, made up of the internal state_m 120 and the internal state_n 130, at the earlier point in time, as shown in FIG. 1, may be made up of the internal state_m+i 220 and the internal state_n+i 230, at the later point in time, as shown in FIG. 2, for example. Similarly, the state in the data area 150, made up of the state_m 160 and the state_n 170, corresponding to the internal state_m 120 and the internal state_n 130, respectively, in the user program 110, at the earlier point in time, as shown in FIG. 1, may be made up of the state_m+i 260 and the state_n+i 270, at the later point in time, as shown in FIG. 2, for example, corresponding to the internal state_m+i 220 and the internal state_n+i 230, respectively, in the user program 110.

In this case, as shown in FIGS. 1 and 2, the internal state_m+i 220 in the user program 110 (as well as the state_m+i 260 in the data area 150) may have changed from the internal state_m 120 in the user program 110 (as well as the state_m 160 in the data area 150). By way of contrast, the internal state_n+i 230 in the user program 110 (as well as the state_n+i 270 in the data area 150) may not have changed from the internal state_n 130 in the user program 110 (as well as the state_n 170 in the data area 150).

Occasionally, something goes wrong. A static random access memory (SRAM) returns the wrong data, for example. A cable connected to the computer is pulled. A power spike occurs. A power cord is removed. In these cases, the computer has no way to update the user's state safely and correctly. The computer may not be aware that it is making an error and/or state changes may be lost entirely.

As described above, one well-known way to handle this sort of error is to run the user programs with redundant hardware. Redundant processors, redundant memory, redundant busses and redundant input/output (I/O) systems can be used to prevent unnoticed and/or irrecoverable problems from terminating a user program. These redundant hardware components typically check each other on a cycle-by-cycle basis, to prevent an error from spreading uncontrollably.

As shown in FIGS. 3-8, it is possible to get substantially the same benefits of fault tolerance using redundant hardware, but without needing cycle-by-cycle comparisons. The redundant computers do not even need to be near each other and can communicate relatively infrequently. Each computer is doing calculations by updating the user state in the user program and data areas. A "digest" may be calculated of these state changes. In one embodiment of the present invention, the digest is a single number that is derived from a large set of other numbers. In this case, the relevant digest may be calculated from the state changes that the computer applies to the user program. In the context of the present invention, the use here of the term "digest" is substantially similar to the use of the term "digest" in the field of cryptography. For example, a "message digest" is the term used in cryptography to describe a numeric "fingerprint" of a message. If a good Digest function is used, there is a vanishingly small chance that two non-identical messages will have the same message digest. Digests may also be applied to any collection of data, such as the state changes the computer applies to the user program. A file can have a digest made from the contents of the file, for example.

In various alternative illustrative embodiments, instead of redundant computers, redundant processors may be used that may be located within a single computer. These redundant processors also do not need to be near each other and can also communicate relatively infrequently. Each processor is doing calculations by updating the user state in its respective user program and data areas. A digest may be calculated of these state changes. This digest is again a single number that is derived from a large set of other numbers. In this case, the relevant digest may be calculated from the state changes the processor applies to the user program.

As shown in FIG. 1, the computer 100 executing the user program 110 updates the state in the user program 110 and the data area 150. FIG. 2 schematically illustrates a later point in time than the earlier point in time schematically illustrated in FIG. 1. In particular, the one giant state machine 140, comprising the user program 110 as well as the internal state of the user program 110, made up of the internal state_m 120 and the internal state_n 130, may have a digest_$p_m p_n$ 180 at the earlier point in time, as shown in FIG. 1. To give a highly simplified example, for the sake of illustration, the internal state_m 120 of the user program 110 may be represented by the numerical value M and the internal state_n 130 of the user program 110 may be represented by the numerical value N. For this highly simplified example, an appropriate digest_ $p_m p_n$ 180 may be given by the unique product $(p_m)^M (p_n)^N = p_m^M p_n^N$, where $p_m$ is the $m^{th}$ prime number and $p_n$ is the $n^{th}$ prime number.

A prime number is any number greater than one (1) that only has one (1) and itself as multiplicative factors. For example, 2 is a prime number (the first prime number, in fact, and the only even prime number). Similarly, 3, 5, 7, 11, 13, 17 and 19 are all prime numbers, completing the list of all prime numbers less than 20. However, 4 is not a prime number, since 4 has 1, 2 and 4 as multiplicative factors. Similarly, 6, 8, 9, 10, 12, 14, 15, 16, 18 and 20 are all non-prime (composite) numbers. Every number greater than one (1) is either prime or non-prime (composite). Furthermore, the fundamental theorem of arithmetic guarantees that every number greater than one (1) is uniquely given by the factorization of that number into prime numbers. For example, $24 = 2^3 3^1 = 2^3 3$, $36 = 2^2 3^2$ and $60 = 2^2 3^1 5^1$.

The one giant state machine 240, comprising the user program 110 as well as the internal state of the user program 110, made up of the internal state_m+i 220 and the internal state_n+i 230, where i=1,2,3, . . . ,Z (for a finite non-negative number Z), may have a digest_$p_{m+i} p_{n+i}$ 280 at the later point in time, as shown in FIG. 2. In the highly simplified example given above for the sake of illustration, the internal state_m+i 220 of the user program 110 may be represented by the numerical value R and the internal state_n+i 230 of the user program 110 may be represented by the numerical value N, the same as the internal state_n 130 of the user program 110. For this highly simplified example, as described above, the appropriate digest_$p_{m+i}p_{n+i}$ 280 may be given by the unique product $(p_{m+i})^R(p_{n+i})^N = p^R_{m+i}p^N_{n+i}$, where $p_{m+i}$ is the $(m+i)^{th}$ prime number and $p_{n+i}$ is the $(n+i)^{th}$ prime number.

For example, if m=1, n=3, M=6 and N=2, the digest_$p_mp_n$ 180=$(p_m)^M(p_n)^N=(p_1)^6(p_3)^2=p_1^6p_3^2=2^65^2=1600$, and, similarly, if R=7 when i=1, since m=1, n=3 and N=2, the digest_$p_{m+i}p_{n+i}$ 280=$(p_{m+i})^R(p_{n+i})^N=(p_{1+1})^7(p_{3+1})^2$ where $(p_{1+1})^7(p_{3+1})^2=(p_2)^7(p_4)^2$ and $(p_2)^7(p_4)^2=p_2^7p_4^2=3^77^2=107163$. Likewise, if R=7 when i=2, since N=2, the digest_$p_{m+i}p_{n+i}$ 280=$(p_{m+i})^R(p_{n+i})^N=(p_{1+2})^7(p_{3+2})^2$ where $(p_{1+2})^7(p_{3+2})^2=(p_3)^7(p_5)^2$ and $(p_3)^7(p_5)^2=p_3^7p_5^2=5^711^2=9453125$.

Conversely, given the digest_$p_{m+i}p_{n+i}$ 280=107163, for m=1 and n=3, when i=1, the fundamental theorem of arithmetic guarantees a unique prime factorization $107163=3^77^2=p_2^7p_4^2$ where $p_2^7p_4^2=(p_2)^7(p_4)^2=(p_{m+i})^7(p_{n+i})^2$, so that the internal state_m+i 220 of the user program 110 must have been represented by the numerical value R=7 and the internal state_n+i 230 of the user program 110 must have been represented by the numerical value N=2. Similarly, given the digest_$p_{m+i}p_{n+i}$ 280=9453125, for m=1 and n=3, when i=2, the fundamental theorem of arithmetic guarantees a unique prime factorization $9453125=5^711^2=p_3^7p_5^2$ where $p_3^7p_5^2=(p_3)^7(p_5)^2=(p_{m+1})^7(p_{n+i})^2$, so that the internal state_m+i 220 of the user program 110 must have been represented by the numerical value R=7 and the internal state_n+i 230 of the user program 110 must have been represented by the numerical value N=2.

Figure 3:
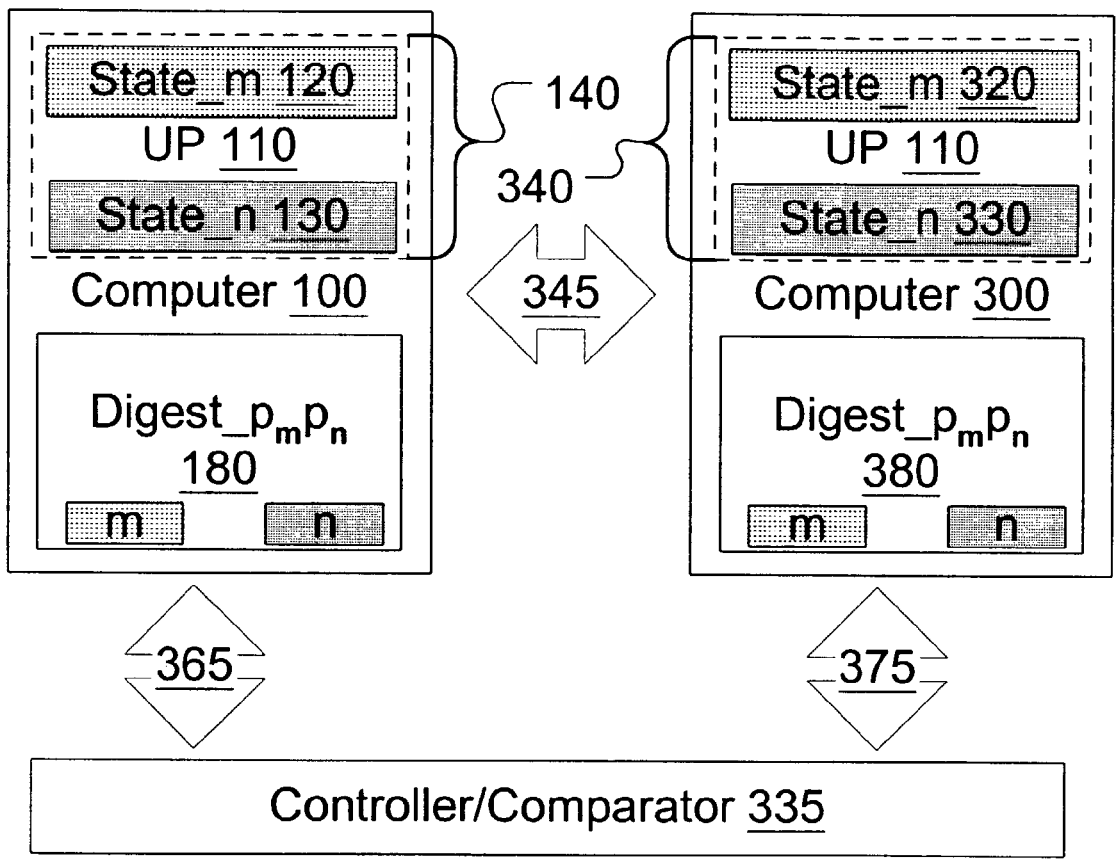
Figure 4:
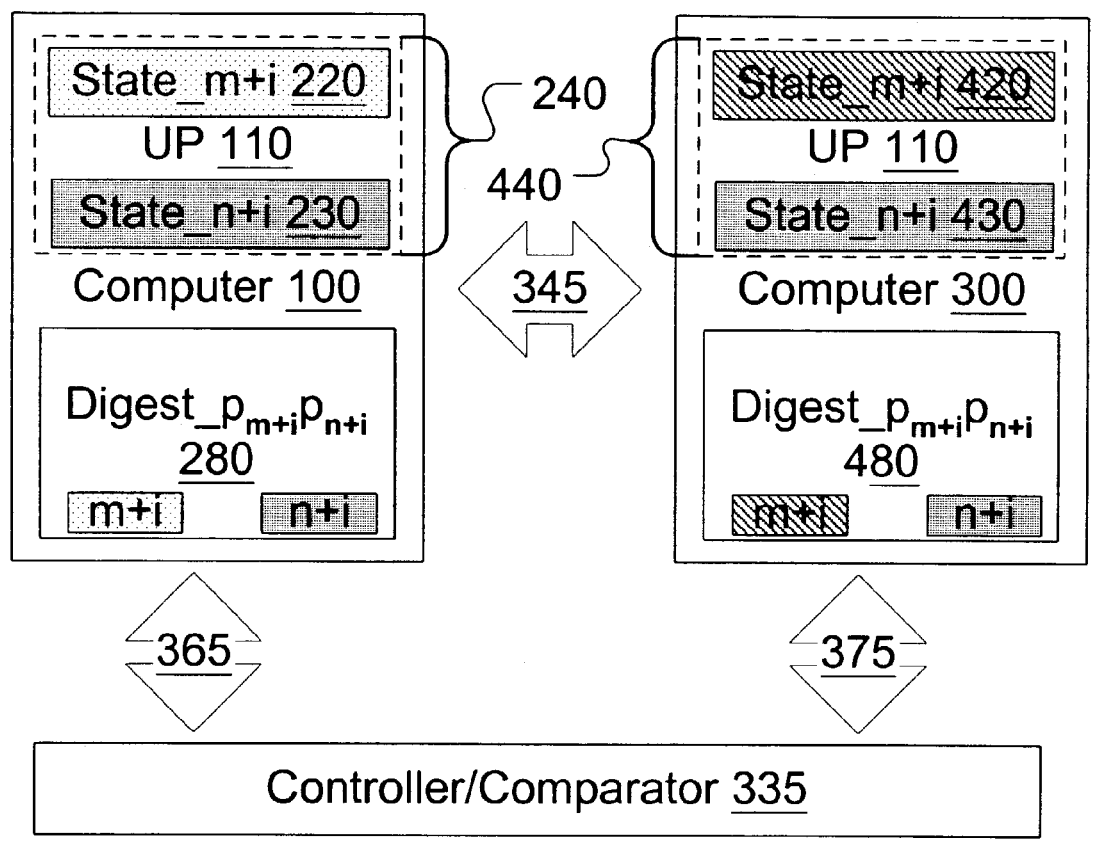

As shown in FIGS. 3 and 4, if two copies of the user program (UP) 110 are executed in isolation from each other by redundant computers 100 and 300, the same digest of their respective state changes should be produced at any given time. If the digests are ever different, the user program (UP) 110 has failed on one of the redundant computers 100 or 300 (or has failed, in different ways, on both). The redundant computers 100 and 300 may communicate with each other via bus 345 and/or via busses 365 and 375 through controller/comparator 335. The controller/comparator 335 may compare the digests.

As shown in FIG. 3, the computers 100 and 300, each executing the user program 110, each updates the state in their respective copy of the user program 110. FIG. 4 schematically illustrates a later point in time than the earlier point in time schematically illustrated in FIG. 3. In particular, the one giant state machine 140, comprising the user program 110 as well as the internal state of the user program 110, made up of the internal state_m 120 and the internal state_n 130, running on the computer 100, may have a digest_$p_mp_n$ 180 at the earlier point in time, as shown in FIG. 3. Similarly, the one giant state machine 340, comprising the user program 110 as well as the internal state of the user program 110, made up of the internal state_m 320 and the internal state_n 330, running on the computer 300, may have a digest_$p_mp_n$ 380 at the earlier point in time, as shown in FIG. 3.

In the highly simplified example given above for the sake of illustration, the internal state_m 120 of the user program 110, running on the computer 100, and the internal state_m 320 of the user program 110, running on the computer 300, may both be represented by the numerical value M. Similarly, the internal state_n 130 of the user program 110, running on the computer 100, and the internal state_n 330 of the user program 110, running on the computer 300, may both be represented by the numerical value N. For this highly simplified example, the appropriate digest_$p_mp_n$ 180 and the appropriate digest_$p_mp_n$ 380 may both be given by the unique product $(p_m)^M(p_n)^N=p_m^Mp_n^N$, is the $m^{th}$ prime number and $p_n$ is the $n^{th}$ prime number.

The one giant state machine 240, comprising the user program 110 as well as the internal state of the user program 110, made up of the internal state_m+i 220 and the internal state_n+i 230, running on the computer 100, may have a digest_$p_{m+i}p_{n+i}$ 280 at the later point in time, as shown in FIG. 4. Similarly, the one giant state machine 440, comprising the user program 110 as well as the internal state of the user program 110, made up of the internal state_m+i 420 and the internal state_n+i 430, running on the computer 300, may have a digest_$p_{m+i}p_{n+i}$ 480 at the later point in time, as shown in FIG. 4.

In the highly simplified example given above for the sake of illustration, the internal state_m+i 220 of the user program 110, running on the computer 100, may be represented by the numerical value R. However, the internal state_m+i 420 of the user program 110, running on the computer 300, may be represented by the numerical value S. Meanwhile, the internal state_n+i 230 of the user program 110, running on the computer 100, and the internal state_n+i 430 of the user program 110, running on the computer 300, may both still be represented by the numerical value N. For this highly simplified example, the appropriate digest_$p_{m+i}p_{n+i}$ 280 may be given by the unique product $(p_{m+i})^R(p_{n+i})^N=p^R_{m+i}p^N_{n+i}$, where $p_{m+i}$ is the $(m+i)^{th}$ prime number and $p_{n+i}$ is the $(n+i)^{th}$ prime number. However, the appropriate digest_$p_{m+i}p_{n+i}$ 480 may be given by the unique product $(p_{m+i})^S(p_{n+i})^N=p^S_{m+i}p^N_{n+i}$, where $p_{m+i}$ is the $(m+i)^{th}$ prime number and $p_{n+i}$ is the $(n+i)^{th}$ prime number.

Whenever the unique product $(p_{m+i})^R(p_{n+i})^N=p^R_{m+i}p^N_{n+i}$ is not equal to the unique product $(p_{m+i})^S(p_{n+i})^N=p^S_{m+i}p^N_{n+i}$, which will occur whenever the numerical value R is not equal to the numerical value S (due to the fundamental theorem of arithmetic), the digest_$p_{m+i}p_{n+i}$ 280 is not equal to the digest_$p_{m+i}p_{n+i}$ 480, in the highly simplified example given above for the sake of illustration. If the digest_$p_{m+i}p_{n+i}$ 280 is not equal to the digest_$p_{m+i}p_{n+i}$ 480, one of the user programs (UP) 110 has failed on one of the redundant computers 100 and 300. The controller/comparator 335 may perform the comparison of the digest_$p_{m+i}p_{n+i}$ 280 with the digest_$p_{m+i}p_{n+i}$ 480.

Figure 5:
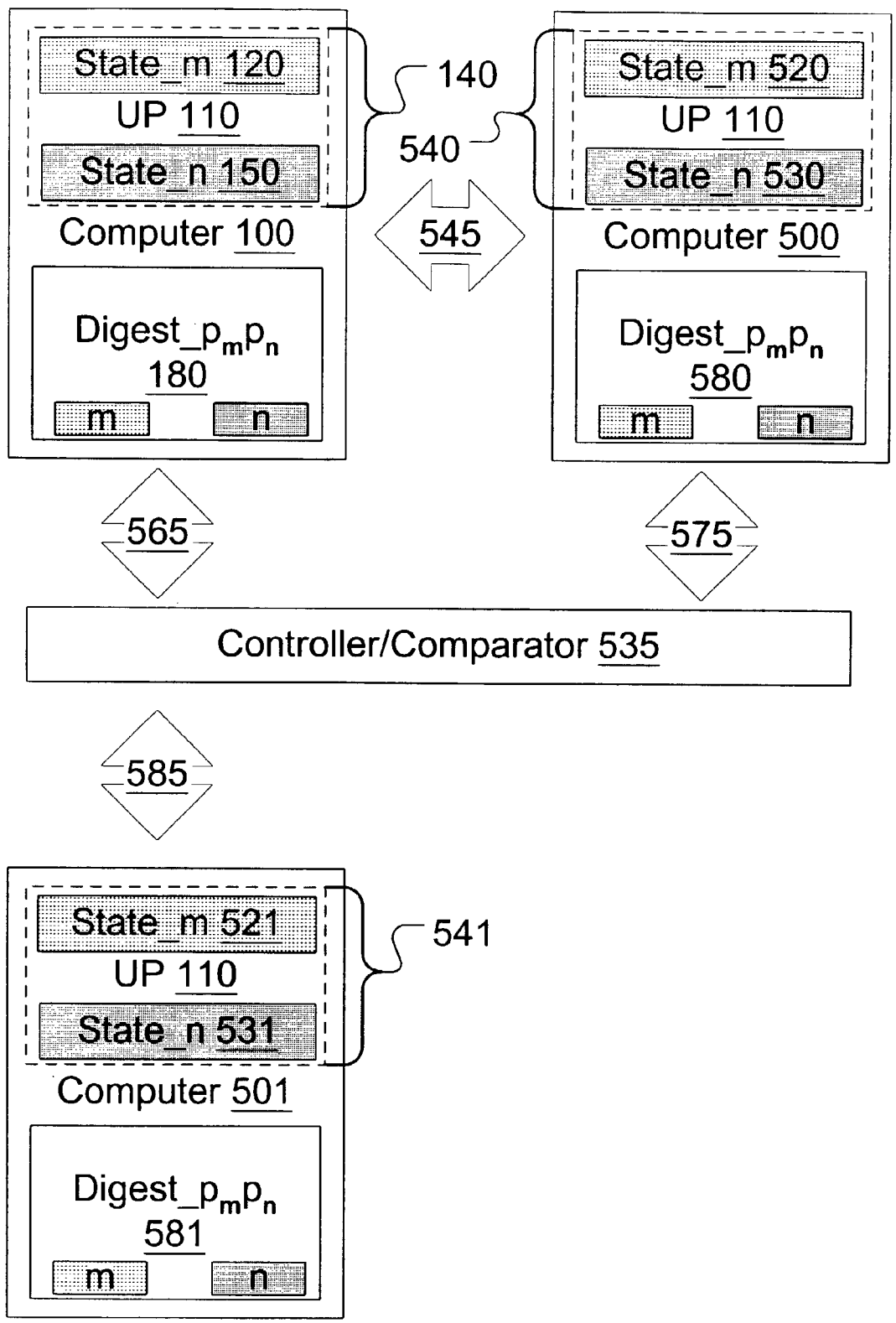
Figure 6:
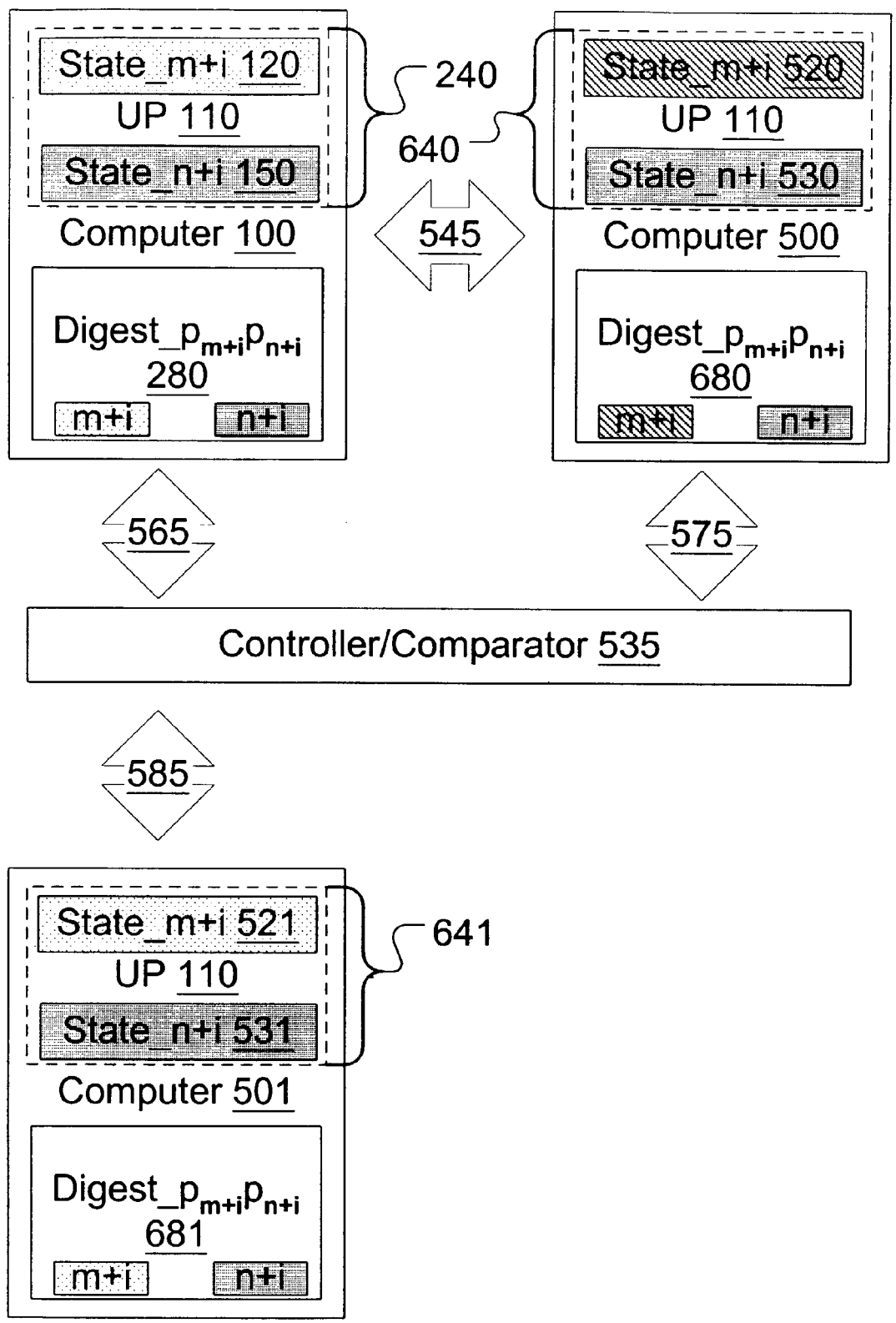

As shown in FIGS. 5 and 6, if three copies of the user program (UP) 110 are executed in isolation from each other by redundant computers 100, 500 and 501, the same digest of their respective state changes should be produced at any given time. If one of the digests is ever different from the other two, the user program (UP) 110 has failed on the redundant computer producing that different digest. The redundant computers 100, 500 and 501 may communicate with each other via busses 545, 565, 575 and/or 585 and/or through controller/comparator 535. The controller/comparator 535 may compare the digests.

As shown in FIG. 5, the computers 100, 500 and 501, each executing the user program 110, each updates the state in their respective copy of the user program 110. FIG. 6 schematically illustrates a later point in time than the earlier point in time schematically illustrated in FIG. 5. In particular, the one giant state machine 140, comprising the user program 110 as well as the internal state of the user program 110, made up of the internal state_m 120 and the internal state_n 130, running on the computer 100, may have a digest_$p_mp_n$ 180 at the earlier point in time, as shown in FIG. 5.

Similarly, the one giant state machine 540, comprising the user program 110 as well as the internal state of the user program 110, made up of the internal state_m 520 and the internal state_n 530, running on the computer 500, may have a digest_$p_mp_n$ 580 at the earlier point in time, as shown in FIG. 5. Likewise, the one giant state machine 541, comprising the user program 110 as well as the internal state of the user program 110, made up of the internal state_m 521 and the internal state_n 531, running on the computer 501, may have a digest_$p_m p_n$ 581 at the earlier point in time, as shown in FIG. 5.

In the highly simplified example given above for the sake of illustration, the internal state_m 120 of the user program 110, running on the computer 100, the internal state_m 520 of the user program 110, running on the computer 500, and the internal state_m 521 of the user program 110, running on the computer 501, may all be represented by the numerical value M. Similarly, the internal state_n 130 of the user program 110, running on the computer 100, the internal state_n 530 of the user program 110, running on the computer 500, and the internal state_n 531 of the user program 110, running on the computer 501, may all be represented by the numerical value N. For this highly simplified example, the appropriate digest_$p_m p_n$ 180, the appropriate digest_$p_m p_n$ 580 and the appropriate digest_$p_m p_n$ 581 may all be given by the unique product $(p_m)^M (p_n)^N = p_m^M p_n^N$, where $p_m$ is the $m^{th}$ prime number and $p_n$ is the $n^{th}$ prime number.

The one giant state machine 240, comprising the user program 110 as well as the internal state of the user program 110, made up of the internal state_m+i 220 and the internal state_n+i 230, running on the computer 100, may have a digest_$p_{m+i} p_{n+i}$ 280 at the later point in time, as shown in FIG. 6. Similarly, the one giant state machine 640, comprising the user program 110 as well as the internal state of the user program 110, made up of the internal state_m+i 620 and the internal state_n+i 630, running on the computer 500, may have a digest_$p_{m+i} p_{n+i}$ 680 at the later point in time, as shown in FIG. 6. Likewise, the one giant state machine 641, comprising the user program 110 as well as the internal state of the user program 110, made up of the internal state_m+i 621 and the internal state_n+i 631, running on the computer 500, may have a digest_$p_{m+i} p_{n+i}$ 681 at the later point in time, as shown in FIG. 6.

In the highly simplified example given above for the sake of illustration, the internal state_m+i 220 of the user program 110, running on the computer 100, and the internal state_m+i 621 of the user program 110, running on the computer 501, may both be represented by the numerical value R. However, the internal state_m+i 620 of the user program 110, running on the computer 500, may be represented by the numerical value S. Meanwhile, the internal state_n+i 230 of the user program 110, running on the computer 100, the internal state_n+i 630 of the user program 110, running on the computer 500, and the internal state_n+i 631 of the user program 110, running on the computer 501, may all still be represented by the numerical value N. For this highly simplified example, the appropriate digest_$p_{m+i} p_{n+i}$ 280 and the appropriate digest_$p_{m+i} p_{n+i}$ 681 may both be given by the unique product $(p_{m+i})^R (p_{n+i})^N = p^R_{m+i} p^N_{n+i}$, where $p_{m+i}$ is the $(m+i)^{th}$ prime number and $p_{n+i}$ is the $(n+i)^{th}$ prime number, whereas the appropriate digest_$p_{m+i} p_{n+i}$ 680 may be given by the unique product $(p_{m+i})^S (p_{n+i})^N = p^S_{m+i} p^N_{n+i}$, where $p_{m+i}$ is the $(m+i)^{th}$ prime number and $p_{n+i}$ is the $(n+i)^{th}$ prime number.

Whenever the unique product $(p_{m+i})^R (p_{n+i})^N = p^R_{m+i} p^N_{n+i}$ is not equal to the unique product $(p_{m+i})^S (p_{n+i})^N = p^S_{m+i} p^N_{n+i}$, which will occur whenever the numerical value R is not equal to the numerical value S (due to the fundamental theorem of arithmetic), the digest_$p_{m+i} p_{n+i}$ 280 and the digest_$p_{m+i} p_{n+i}$ 681 are each not equal to the digest_$p_{m+i} p_{n+i}$ 680, in the highly simplified alternative example given above for the sake of illustration. If the digest_$p_{m+i} p_{n+i}$ 280 and the digest_$p_{m+i} p_{n+i}$ 681, which are equal to each other, are each not equal to the digest_$p_{m+i} p_{n+i}$ 680, most likely the user program (UP) 110 has failed on the redundant computer 500. The controller/comparator 535 may perform the comparisons between the digest_$p_{m+i} p_{n+i}$ 280, the digest_$p_{m+i} p_{n+i}$ 680 and/or the digest_$p_{m+i} p_{n+i}$ 681.

In various illustrative embodiments of the present invention, a digest is calculated of the state changes applied to a user program. Several copies of the user program are run on a plurality of computers. The digests from each of the computers may be compared. For example, when the user programs exit their respective computers, the final digests from each of the computers may be compared. If all the digests agree, then no failure has occurred in any of the computers (unless exactly the same failure has occurred in all the computers in exactly the same way, which is highly unlikely). If a minority of the digests are different from a majority digest (or a plurality digest, if there is no clear majority digest), then the results of the computers producing the minority "wrong" digests are ignored. The digests from each of the computers may be compared more often than only when the user programs exit their respective computers.

Figure 7:
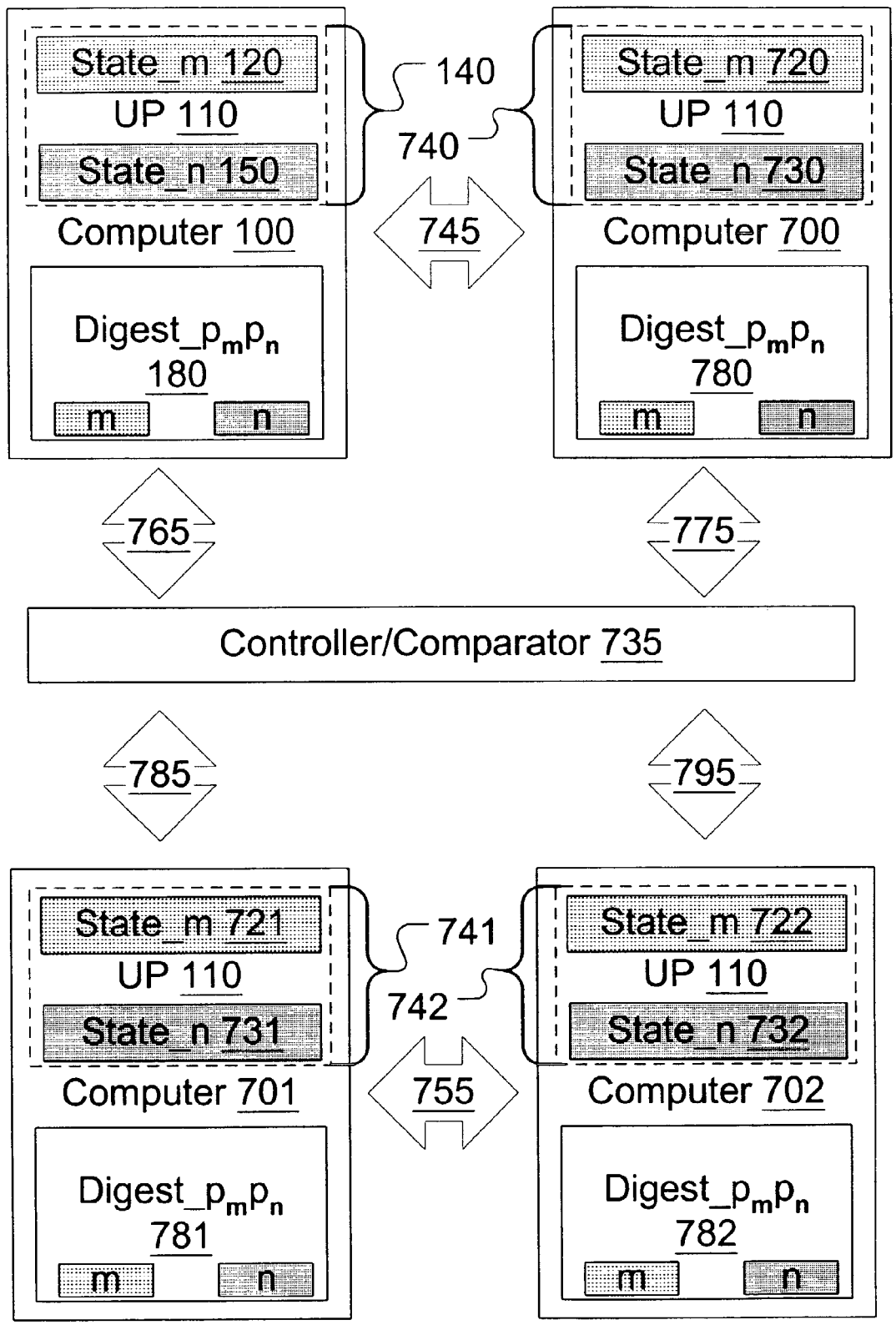
Figure 8:
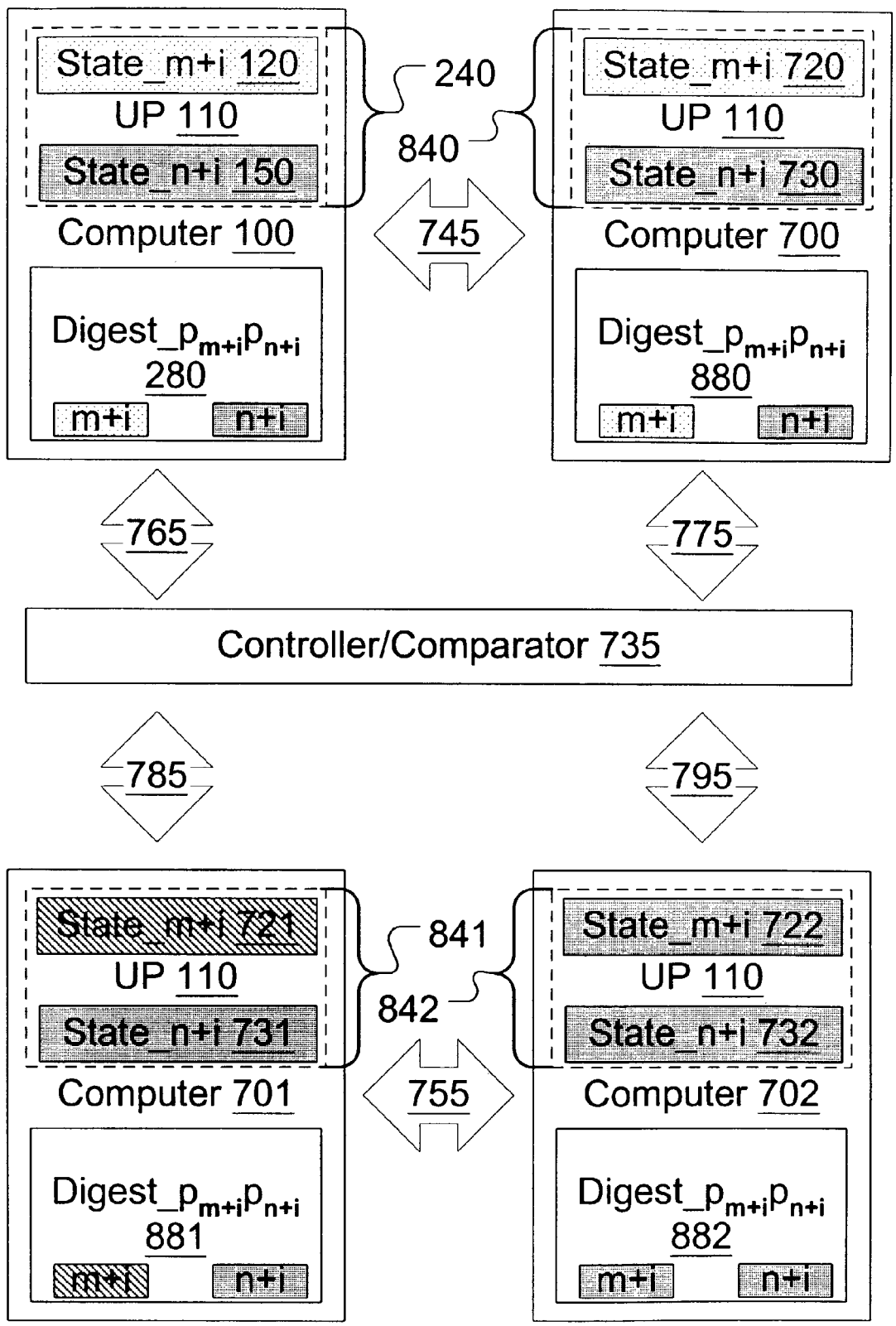

As shown in FIGS. 7 and 8, for example, a plurality of copies of the user program (UP) 110 are executed in isolation from each other by a plurality of redundant computers 100, 700, 701 and 702. The same final digest of their respective state changes should be produced. If one or more of the digests is different from a majority of the other digests, the user program (UP) 110 has failed on the redundant computer(s) producing the different minority digest(s). The redundant computers 100, 700, 701 and 702 may communicate with each other via busses 745, 765, 775, 785 and/or 795 and/or through controller/comparator 735. The controller/comparator 735 may compare the digests.

As shown in FIG. 7, the computers 100, 700, 701 and 702, each executing the user program 110, each updates the state in their respective copy of the user program 110. FIG. 8 schematically illustrates a later point in time than the earlier point in time schematically illustrated in FIG. 7. In particular, the one giant state machine 140, comprising the user program 110 as well as the internal state of the user program 110, made up of the internal state_m 120 and the internal state_n 130, running on the computer 100, may have a digest_$p_m p_n$ 180 at the earlier point in time, as shown in FIG. 7. Similarly, the one giant state machine 740, comprising the user program 110 as well as the internal state of the user program 110, made up of the internal state_m 720 and the internal state_n 730, running on the computer 700, may have a digest_$p_m p_n$ 780 at the earlier point in time, as shown in FIG. 7.

Likewise, the one giant state machine 741, comprising the user program 110 as well as the internal state of the user program 110, made up of the internal state_m 721 and the internal state_n 731, running on the computer 701, may have a digest_$p_m p_n$ 781 at the earlier point in time, as shown in FIG. 7. Similarly, the one giant state machine 742, comprising the user program 110 as well as the internal state of the user program 110, made up of the internal state_m 722 and the internal state_n 732, running on the computer 702, may have a digest_$p_m p_n$ 782 at the earlier point in time, as shown in FIG. 7.

In the highly simplified example given above for the sake of illustration, the internal state_m 120 of the user program 110, running on the computer 100, the internal state_m 720 of the user program 110, running on the computer 700, the internal state_m 721 of the user program 110, running on the computer 701, and the internal state_m 722 of the user program 110, running on the computer 702, may all be represented by the numerical value M. Similarly, the internal state_n 130 of the user program 110, running on the computer 100, the internal state_n 730 of the user program 110, running on the computer 700, the internal state_n 731 of the user program 110, running on the computer 701, and the internal state_n 732 of the user program 110, running on the computer 702, may all be represented by the numerical value N. For this highly simplified example, the appropriate digest_$p_m p_n$ 180, the appropriate digest_$p_m p_n$ 780, the appropriate digest_$p_m p_n$ 781 and the appropriate digest_$p_m p_n$ 782 may all be given by the unique product $(p_m)^M (p_n)^N = p_m^M p_n^N$, where $p_m$ is the $m^{th}$ prime number and $p_n$ is the $n^{th}$ prime number.

The one giant state machine 240, comprising the user program 110 as well as the internal state of the user program 110, made up of the internal state_+i 220 and the internal state_n+i 230, running on the computer 100, may have a digest_$p_{m+i} p_{n+i}$ 280 at the later point in time, as shown in FIG. 8. Similarly, the one giant state machine 840, comprising the user program 110 as well as the internal state of the user program 110, made up of the internal state_m+i 820 and the internal state_n+i 830, running on the computer 700, may have a digest_$p_{m+i} p_{n+i}$ 880 at the later point in time, as shown in FIG. 8.

Likewise, the one giant state machine 841, comprising the user program 110 as well as the internal state of the user program 110, made up of the internal state_m+i 821 and the internal state_n+i 831, running on the computer 700, may have a digest_$p_{m+i} p_{n+i}$ 881 at the later point in time, as shown in FIG. 8. Similarly, the one giant state machine 842, comprising the user program 110 as well as the internal state of the user program 110, made up of the internal state_m+i 822 and the internal state_n+i 832, running on the computer 700, may have a digest_$p_{m+i} p_{n+i}$ 882 at the later point in time, as shown in FIG. 8.

In the highly simplified example given above for the sake of illustration, the internal state_m+i 220 of the user program 110, running on the computer 100, and the internal state_m+i 820 of the user program 110, running on the computer 700, may both be represented by the numerical value R. However, the internal state_m+i 821 of the user program 110, running on the computer 701, may be represented by the numerical value S, and the internal state_m+i 822 of the user program 110, running on the computer 702, may be represented by the numerical value T. Meanwhile, the internal state_n+i 230 of the user program 110, running on the computer 100, the internal state_n+i 830 of the user program 110, running on the computer 700, the internal state_n+i 831 of the user program 110, running on the computer 701, and the internal state_n+i 832 of the user program 110, running on the computer 702, may all still be represented by the numerical value N. For this highly simplified example, the appropriate digest_$p_{m+i} p_{n+i}$ 280 and the appropriate digest_$p_{m+i} p_{n+i}$ 880 may both be given by the unique product $(p_{m+i})^R (p_{n+i})^N = p_{m+i}^R p_{n+i}^N$, where $p_{m+i}$ is the $(m+i)^{th}$ prime number and $p_{n+i}$ is the $(n+i)^{th}$ prime number, whereas the appropriate digest_$p_{m+i} p_{n+i}$ 881 may be given by the unique product $(p_{m+i})^S (p_{n+i})^N = p_{m+i}^S p_{n+i}^N$, where $p_{m+i}$ is the $(m+i)^{th}$ prime number and $p_{n+i}$ is the $(n+i)^{th}$ prime number, and the appropriate digest_$p_{m+i} p_{n+i}$ 882 may be given by the unique product $(p_{m+i})^T (p_{n+i})^N = p_{m+i}^T p_{n+i}^N$, where $p_{m+i}$ is the $(m+i)^{th}$ prime number and $p_{n+i}$ is the $(n+i)^{th}$ prime number.

Whenever the unique product $(p_{m+i})^R (p_{n+i})^N = p_{m+i}^R p_{n+i}^N$ is not equal to the unique product $(p_{m+i})^S (p_{n+i})^N = p_{m+i}^S p_{n+i}^N$ or to the unique product $(p_{m+i})^T (p_{n+i})^N = p_{m+i}^T p_{n+i}^N$, which will occur whenever the numerical value R is not equal to the numerical value S or to the numerical value T (due to the fundamental theorem of arithmetic), the digest_$p_{m+i} p_{n+i}$ 280 and the digest_$p_{m+i} p_{n+i}$ 880 are each not equal to the digest_$p_{m+i} p_{n+i}$ 881 or to the digest_$p_{m+i} p_{n+i}$ 882, in the highly simplified alternative example given above for the sake of illustration. If the digest_$p_{m+i} p_{n+i}$ 280 and the digest_$p_{m+i} p_{n+i}$ 880, which are equal to each other, are not equal to the digest_$p_{m+i} p_{n+i}$ 881 or to the digest_$p_{m+i} p_{n+i}$ 882, most likely has the user program (UP) 110 has failed on each of the redundant computers 701 and 702 (perhaps for different reasons). The controller/comparator 735 may perform the comparisons between the digest_$p_{m+i} p_{n+i}$ 280, the digest_$p_{m+i} p_{n+i}$ 880, the digest_$p_{m+i} p_{n+i}$ 881 and/or the digest_$p_{m+i} p_{n+i}$ 882.

In various illustrative embodiments of the present invention, the digest may be calculated incrementally. The digest may also be checked more frequently than just when the user program exits. This will be necessary for "immortal" or long-lived programs to be run in a fault-tolerant environment, since immortal or long-lived programs rarely, if ever, exit. This will reduce the probability that several faults will occur between the start and the stop of the user program, which could result in all copies of the user program having different digests. If all copies of the user program have different digests, then all copies should be discarded.

In various illustrative embodiments of the present invention, the computers may be run on their respective copies of the user program for a fixed number of cycles and then the digests may be captured. For example, it may take about 1 to 3 msec for a computer to execute about one million instructions. If the digests for the respective computers were compared about every 1 to 3 msec, which would be relatively simple to do, then a failing computer could be detected this way fairly early.

In various illustrative embodiments of the present invention, an unmodified processor could count instructions executed by running in single-step mode when running a user program in fault-tolerant mode. The unmodified processor may run for a fixed number of memory references. Alternatively, the unmodified processor may run for a fixed number of branch instructions.

In various alternative illustrative embodiments of the present invention, a modified processor may have an instruction count register that would let the modified processor measure when to calculate a digest for the user program currently running. The number of instructions executed and/or the number of branches would have to be kept on a process-by-process basis.

A digest calculation may also have to be triggered when certain traps occur. This would catch updates to the file system and keep the updates to the file system from happening from a copy of a user program running on a computer that has made an error.

In various illustrative embodiments of the present invention, the digest may be calculated from only some of the state changes. For example, the digest may be updated only when the computer makes writes to memory and/or when the computer makes kernel calls with outgoing arguments and/or when the kernel fetches data out of the user address space. In particular, the digest may not be updated every time a processor register changes. The changes to the registers will ultimately result in a final set of register values which will be saved to memory when a digest is calculated. Since memory writes are watched, the digest will automatically include register values (e.g., the final set of register values), at a relatively tiny cost compared to a digest update for each register write.

Digest updates to the stack may be avoided by maintaining min and max stack-modified registers. When the digest is periodically calculated, the changed part of the stack may be included in the digest.

In various illustrative embodiments of the present invention, digest calculations may be implemented completely in software. The kernel can mark all pages as read-only. Every time a processor write is done to memory, the address and data may be recorded and/or the digest may be updated in the trap handler. Then memory may be updated. The state to calculate the digest would have to be kept on a process-by-process basis.

In various alternative illustrative embodiments of the present invention, hardware support may be added to the processor to make digest updates be done automatically at run-time. For example, this hardware support may be a simple block watching writes to memory. The simple block watching writes to memory would have to be aware of whether the cache was write-back or write-through. The state to calculate the digest would have to be kept on a process-by-process basis.

The operating system (OS) will have to be able to cause a digest calculation to be made in several running copies of a user program in a cycle-accurate fashion. The digest calculation must be made at exactly the same time, from the perspective of the state updates, in all redundant processors running the user programs. This may be achieved by counting events in the running of the user program, such as writes and/or traps, as described above.

The operating system (OS) must also be able to discard the results generated by a failing processor. This may be accomplished by stopping any changes to external state until digests from running different copies of the user program match.

The operating system (OS) must further be able to kill and restart a copy of a user program to replace a copy of the user program running on a computer that has created an incorrect digest. This can be done by copying state from the remaining correct copies of the user program running on the fault-free computers.

FIGS. 9-14 schematically illustrate particular embodiments of respective methods 900-1400 practiced in accordance with the present invention. FIGS. 1-8 schematically illustrate various exemplary particular embodiments with which the methods 900-1400 may be practiced. For the sake of clarity, and to further an understanding of the invention, the methods 900-1400 shall be disclosed in the context of the various exemplary particular embodiments shown in FIGS. 1-8. However, the present invention is not so limited and admits wide variation, as is discussed further below.

Figure 9:
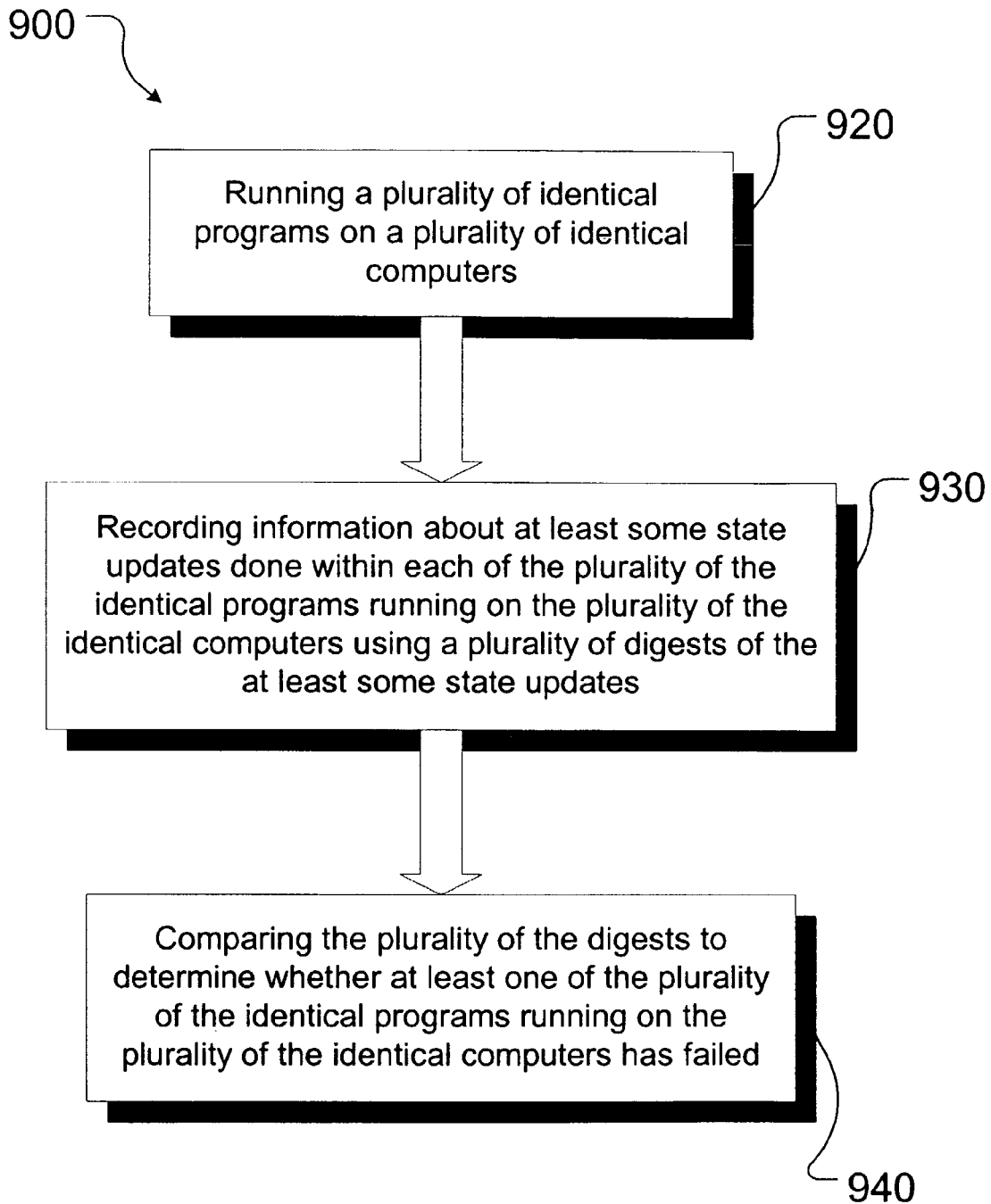

As shown in FIG. 9, the method 900 begins, as set forth in box 920, by running a plurality of identical programs on a plurality of identical computers. For example, as shown in FIGS. 3-8, the user program 110 is run on the computer 100 and one or more of computers 300, 500, 501, 700, 701 and 702. The method 900 proceeds by recording information about at least some state updates done within each of the plurality of the identical programs running on the plurality of the identical computers using a plurality of digests of the at least some state updates, as set forth in box 930. For example, as shown in FIGS. 3-8, information about one or more state updates done within each of the plurality of the identical user programs 110 run on the computers 100, 300, 500, 501, 700, 701 and/or 702 are recorded using the digests_$p_m p_n$ 180, 380, 580, 581, 780, 781 and/or 782, and/or digests_$p_{m+i} p_{n+i}$ 280, 480, 680, 681, 880, 881 and/or 882.

The method 900 then proceeds, as set forth in box 940, by comparing the plurality of the digests to determine whether at least one of the plurality of the identical programs running on the plurality of the identical computers has failed. For example, as shown in FIGS. 3-8, the controller/comparators 335, 535 and/or 735 perform the comparisons between the digests_$p_{m+i} p_{n+i}$ 280, 480, 680, 681, 880, 881 and/or 882.

Figure 10:
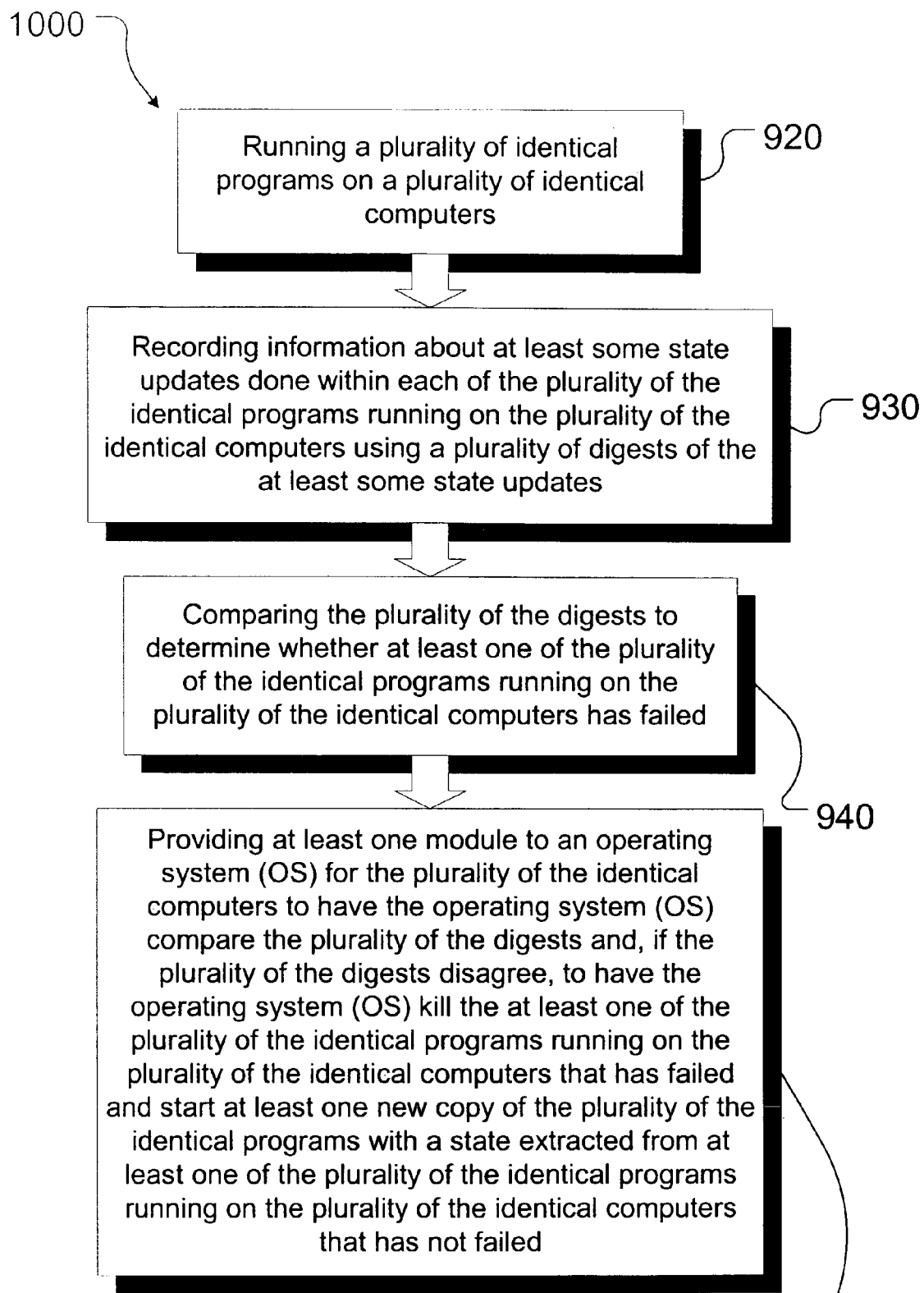

In various illustrative embodiments, as shown in FIG. 10, and as set forth in box 1050 of method 1000, the method 1000 further comprises providing at least-one module to an operating system (OS) for the plurality of the identical computers to have the operating system (OS) compare the plurality of the digests. If the plurality of the digests disagree, the operating system (OS) kills the at least one of the plurality of the identical programs running on the plurality of the identical computers that has failed and starts at least one new copy of the plurality of the identical programs with a state extracted from at least one of the plurality of the identical programs running on the plurality of the identical computers that has not failed.

Figure 11:
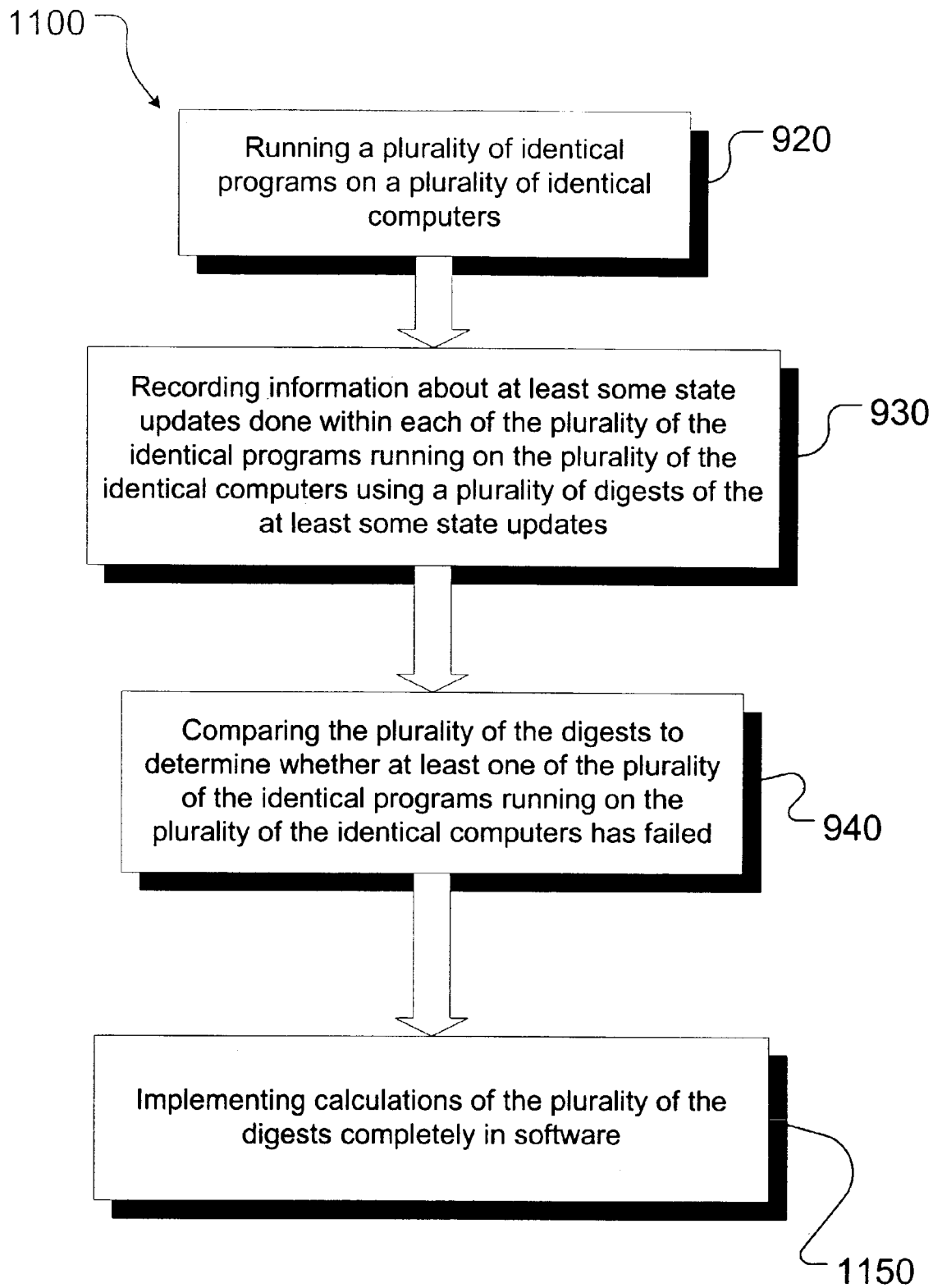
Figure 12:
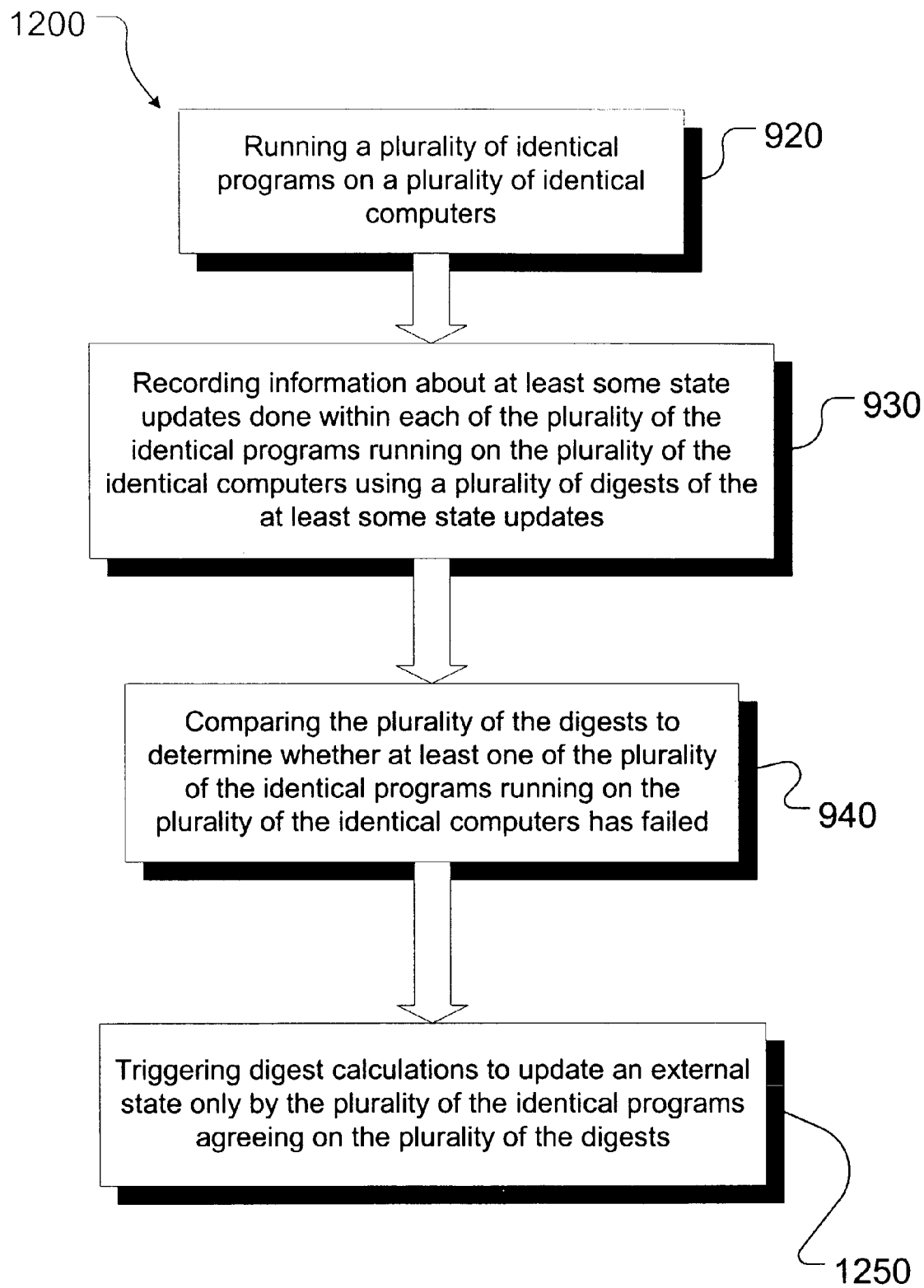

In various alternative illustrative embodiments, as shown in FIG. 11, and as set forth in box 1150 of method 1100, recording information about at least some state updates done within each of the plurality of the identical programs running on the plurality of the identical computers using a plurality of digests of the at least some state updates comprises implementing calculations of the plurality of the digests completely in software. In various other alternative illustrative embodiments, as shown in FIG. 12, and as set forth in box 1250 of method 1200, the method 1200 further comprises triggering digest calculations to update an external state only by the plurality of the identical programs agreeing on the plurality of the digests.

Figure 13:
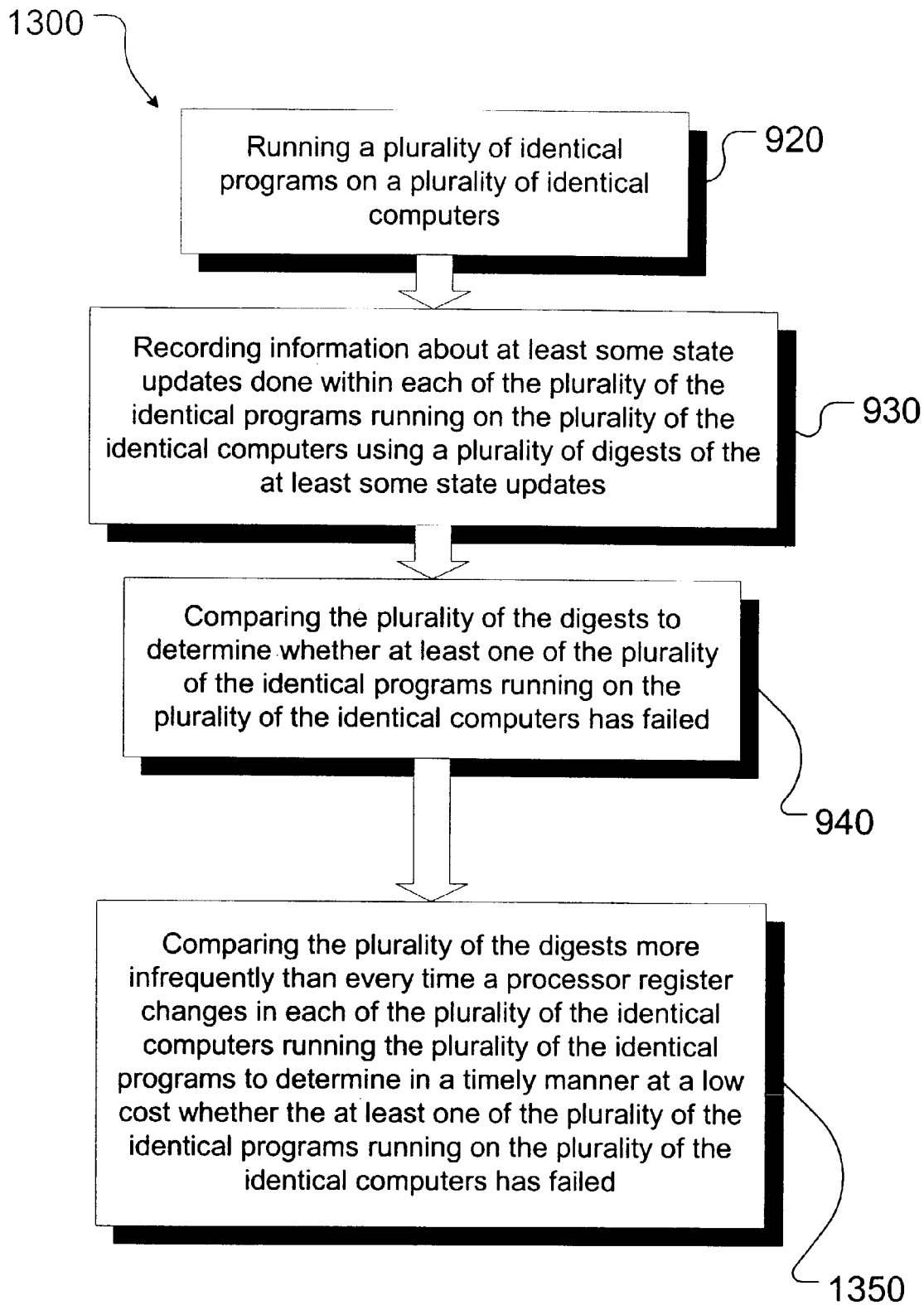
Figure 14:
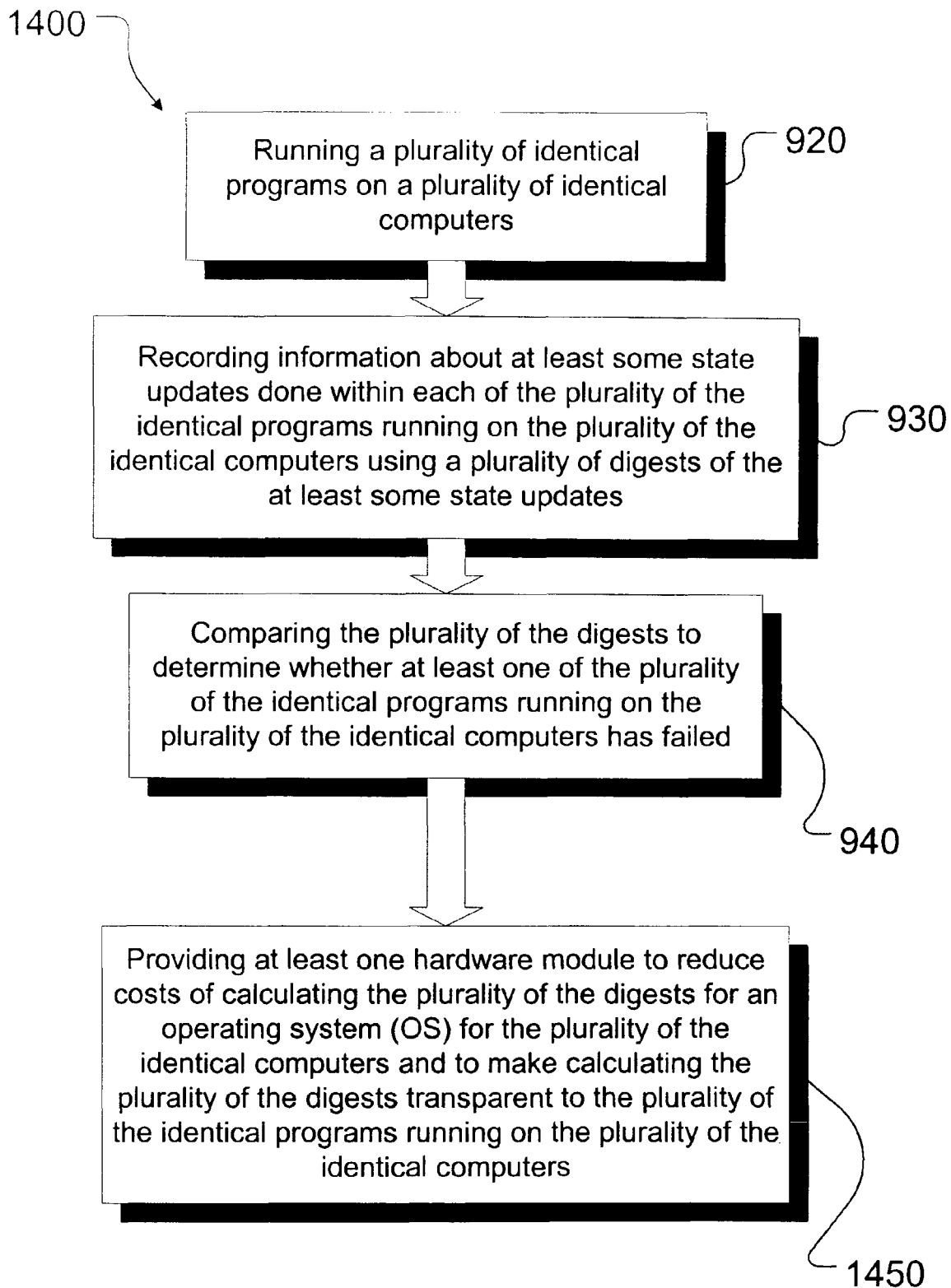

In various alternative illustrative embodiments, as shown in FIG. 13, and as set forth in box 1350 of method 1300, comparing the plurality of the digests to determine whether the at least one of the plurality of the identical programs running on the plurality of the identical computers has failed comprises comparing the plurality of the digests more infrequently than every time a processor register changes in each of the plurality of the identical computers running the plurality of the identical programs to determine in a timely manner at a low cost whether the at least one of the plurality of the identical programs running on the plurality of the identical computers has failed. In various other alternative illustrative embodiments, as shown in FIG. 14, and as set forth in box 1450 of method 1400, the method 1400 further comprises providing at least one hardware module to reduce costs of calculating the plurality of the digests for an operating system (OS) for the plurality of the identical computers and to make calculating the plurality of the digests transparent to the plurality of the identical programs running on the plurality of the identical computers.

Any of the above-disclosed embodiments of a method, a system and a device according to the present invention enables the implementation of fault tolerance without requiring tight and/or lock-step cooperation between computer hardware. Additionally, any of the above-disclosed embodiments of a method, a system and a device according to the present invention enables the implementation of fault tolerance without requiring massive rewrites of user-level computer software.

Moreover, an embodiment of the invention can be implemented as computer software in the form of computer readable program code executed in a general purpose computing environment; in the form of bytecode class files executable within a Java™ run time environment running in such an environment; in the form of bytecodes running on a processor (or devices enabled to process bytecodes) existing in a distributed environment (e.g., one or more processors on a network); as microprogrammed bit-slice hardware; as digital signal processors; or as hard-wired control logic.

An embodiment of the invention can be implemented within a client/server computer system. In this system, computers can be categorized as two types: servers and clients. Computers that provide data, software and services to other computers are servers; computers that are used to connect users to those data, software and services are clients. In operation, a client communicates, for example, requests to a server for data, software and services, and the server responds to the requests. The server's response may entail communication with a file management system for the storage and retrieval of files.

The computer system can be connected through an interconnect fabric. The interconnect fabric can comprise any of multiple, suitable communication paths for carrying data between the computers. In one embodiment the interconnect fabric is a local area network implemented as an intranet or Ethernet network. Any other local network may also be utilized. The invention also contemplates the use of wide area networks, the Internet, the World Wide Web, and others. The interconnect fabric may be implemented with a physical medium, such as a wire or fiber optic cable, or it may be implemented in a wireless environment.

In general, the Internet is referred to as an unstructured network system that uses Hyper Text Transfer Protocol (HTTP) as its transaction protocol. An internal network, also known as intranet, comprises a network system within an enterprise. The intranet within an enterprise is typically separated from the Internet by a firewall. Basically, a firewall is a barrier to keep destructive services on the public Internet away from the intranet.

The internal network (e.g., the intranet) provides actively managed, low-latency, high-bandwidth communication between the computers and the services being accessed. One embodiment contemplates a single-level, switched network with cooperative (as opposed to competitive) network traffic. Dedicated or shared communication interconnects may be used in the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. A method comprising:
    running a plurality of identical programs on a plurality of identical computers;
    recording information about at least some state updates done within each of the plurality of the identical programs running on the plurality of the identical computers using a plurality of digests of the at least some state updates; and
    comparing the plurality of the digests to determine whether at least one of the plurality of the identical programs running on the plurality of the identical computers has failed.

2. The method of claim 1, wherein recording information about the at least some state updates done within each of the plurality of the identical programs running on the plurality of the identical computers using the plurality of the digests of the at least some state updates comprises implementing calculations of the plurality of the digests completely in software.

3. The method of claim 2, further comprising:
    providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

4. The method of claim 1, further comprising:
    triggering digest calculations to update an external state only by the plurality of the identical programs agreeing on the plurality of the digests.

5. The method of claim 4, further comprising:
    providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

6. The method of claim 1, wherein comparing the plurality of the digests to determine whether the at least one of the plurality of the identical programs running on the plurality of the identical computers has failed comprises comparing the plurality of the digests more infrequently than every time a processor register changes in each of the plurality of the identical computers running the plurality of the identical programs to determine in a timely manner and at a low cost whether the at least one of the plurality of the identical programs running on the plurality of the identical computers has failed.

7. The method of claim 6, further comprising:
    providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

8. The method of claim 1, further comprising:
    providing at least one hardware module to reduce costs of calculating the plurality of the digests for an operating system (OS) for the plurality of the identical computers and to make calculating the plurality of the digests transparent to the plurality of the identical programs running on the plurality of the identical computers.

9. The method of claim 8, further comprising:
    providing at least one module to the operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

10. The method of claim 1, further comprising:
providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

11. The method of claim 1, wherein the method is performed by instructions encoded within a computer-readable, program storage device and wherein when executed by a computer, the instructions perform the method.

12. The method of claim 1, wherein the method is performed by a computer that has been programmed to perform the method.

13. An apparatus comprising:
a plurality of identical computers capable of running a plurality of identical programs;
a plurality of digests capable of recording information about at least some state updates done within each of the plurality of the identical programs running on the plurality of the identical computers; and
a controller/comparator capable of comparing the plurality of the digests to determine whether at least one of the plurality of the identical programs running on the plurality of the identical computers has failed.

14. The apparatus of claim 13, wherein the plurality of the digests of the at least some state updates are capable of being calculated completely in software.

15. The apparatus of claim 14, further comprising:
at least one module provided to an operating system (OS) for the plurality of the identical computers capable of having the operating system (OS) compare the plurality of the digests and, if the plurality of the digests disagree, capable of having the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

16. The apparatus of claim 13, further comprising:
digest calculations capable of triggering an update of an external state only when the plurality of the identical programs agree on the plurality of the digests.

17. The apparatus of claim 16, further comprising:
at least one module provided to an operating system (OS) for the plurality of the identical computers capable of having the operating system (OS) compare the plurality of the digests and, if the plurality of the digests disagree, capable of having the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

18. The apparatus of claim 13, wherein the controller/comparator is capable of comparing the plurality of the digests more infrequently than every time a processor register changes in each of the plurality of the identical computers running the plurality of the identical programs to determine in a timely manner and at a low cost whether the at least one of the plurality of the identical programs running on the plurality of the identical computers has failed.

19. The apparatus of claim 18, further comprising:
at least one module provided to an operating system (OS) for the plurality of the identical computers capable of having the operating system (OS) compare the plurality of the digests and, if the plurality of the digests disagree, capable of having the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

20. The apparatus of claim 13, further comprising:
at least one hardware module capable of reducing costs of calculating the plurality of the digests for an operating system (OS) for the plurality of the identical computers and capable of making such calculation of the plurality of the digests transparent to the plurality of the identical programs running on the plurality of the identical computers.

21. The apparatus of claim 20, further comprising:
at least one module provided to the operating system (OS) for the plurality of the identical computers capable of having the operating system (OS) compare the plurality of the digests and, if the plurality of the digests disagree, capable of having the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

22. The apparatus of claim 13, further comprising:
at least one module provided to an operating system (OS) for the plurality of the identical computers capable of having the operating system (OS) compare the plurality of the digests and, if the plurality of the digests disagree, capable of having the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

23. The apparatus of claim 13, further comprising:
a network, wherein the plurality of identical computers capable of running the plurality of identical programs are connected with the network and wherein the controller/comparator is capable of comparing the plurality of the digests via the network.

24. The apparatus of claim 23, wherein the network comprises a wide area network and a local area network.

25. The apparatus of claim 24, further comprising:
a firewall, wherein the plurality of identical computers are separated from the wide area network through the firewall.

26. An apparatus comprising:
means for running a plurality of identical programs on a plurality of identical computers;
means for recording information about at least some state updates done within each of the plurality of the identical programs running on the plurality of the identical computers using a plurality of digests of the at least some state updates; and
means for comparing the plurality of the digests to determine whether at least one of the plurality of the identical programs running on the plurality of the identical computers has failed.

27. The apparatus of claim 26, wherein the means for recording information about the at least some state updates done within each of the plurality of the identical programs running on the plurality of the identical computers using the plurality of the digests of the at least some state updates comprises means for implementing calculations of the plurality of the digests completely in software.

28. The apparatus of claim 27, further comprising:
means for providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

29. The apparatus of claim 26, further comprising:
means for triggering digest calculations to update an external state only by the plurality of the identical programs agreeing on the plurality of the digests.

30. The apparatus of claim 29, further comprising:
means for providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

31. The device of claim 26, wherein the means for comparing the plurality of the digests to determine whether the at least one of the plurality of the identical programs running on the plurality of the identical computers has failed comprises means for comparing the plurality of the digests more infrequently than every time a processor register changes in each of the plurality of the identical computers running the plurality of the identical programs to determine in a timely manner and at a low cost whether the at least one of the plurality of the identical programs running on the plurality of the identical computers has failed.

32. The device of claim 31, further comprising:
means for providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

33. The device of claim 26, further comprising:
means for providing at least one hardware module to reduce costs of calculating the plurality of the digests for an operating system (OS) for the plurality of the identical computers and to make calculating the plurality of the digests transparent to the plurality of the identical programs running on the plurality of the identical computers.

34. The device of claim 33, further comprising:
means for providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

35. The device of claim 26, further comprising:
means for providing at least one module to an operating system (OS) for the plurality of the identical computers to have the operating system (OS) compare the plurality of the digests and, if the plurality of the digests disagree, to have the operating system (OS) kill the at least one of the plurality of the identical programs running on the plurality of the identical computers that has failed and start at least one new copy of the plurality of the identical programs with a state extracted from at least one of the plurality of the identical programs running on the plurality of the identical computers that has not failed.

* * * * *